(12) United States Patent
Dering et al.

(10) Patent No.: US 11,623,281 B2
(45) Date of Patent: Apr. 11, 2023

(54) BUILD MATERIAL APPLICATION DEVICE

(71) Applicant: CONCEPT LASER GMBH, Lichtenfels (DE)

(72) Inventors: Viktor Dering, Coburg (DE); Alexander Hofmann, Weismain (DE); Daniel Winiarski, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 955 days.

(21) Appl. No.: 16/273,099

(22) Filed: Feb. 11, 2019

(65) Prior Publication Data
US 2019/0275586 A1 Sep. 12, 2019

(30) Foreign Application Priority Data

Mar. 9, 2018 (EP) ..................................... 18161050

(51) Int. Cl.
| | |
|---|---|
| *B29C 64/214* | (2017.01) |
| *B22F 12/00* | (2021.01) |
| *B33Y 40/00* | (2020.01) |
| B33Y 30/00 | (2015.01) |
| B22F 10/10 | (2021.01) |

(52) U.S. Cl.
CPC ............ *B22F 12/00* (2021.01); *B29C 64/214* (2017.08); *B33Y 40/00* (2014.12); *B22F 10/10* (2021.01); *B22F 2999/00* (2013.01); *B33Y 30/00* (2014.12)

(58) Field of Classification Search
CPC ............................... B29C 64/214; B22F 12/67
See application file for complete search history.

(56) References Cited

FOREIGN PATENT DOCUMENTS

| | | |
|---|---|---|
| DE | 102006056422 B3 | 4/2008 |
| EP | 3168033 A1 | 5/2017 |
| JP | H071718 A | 1/1995 |

*Primary Examiner* — Timothy Kennedy
(74) *Attorney, Agent, or Firm* — Dority & Manning, P.A.

(57) ABSTRACT

Build material application device for additively manufacturing a three-dimensional object, the build material application device comprising: at least one blade-like build material application member; at least one support unit for supporting the blade-like build material application member, wherein the support unit comprises at least two support unit members defining a receiving section for receiving a blade-like build material application member, a first support unit member is moveably supported relative to a second support unit member between a first operating position, in which a holding force is exertable or exerted on a blade-like build material application member received in the receiving section, and a second operating position, in which no holding force is exertable or exerted on a blade-like build material application member received in the receiving section.

16 Claims, 3 Drawing Sheets

BUILD MATERIAL APPLICATION DEVICE

CROSS-REFERENCE TO RELATED APPLICATIONS

Figure 1:
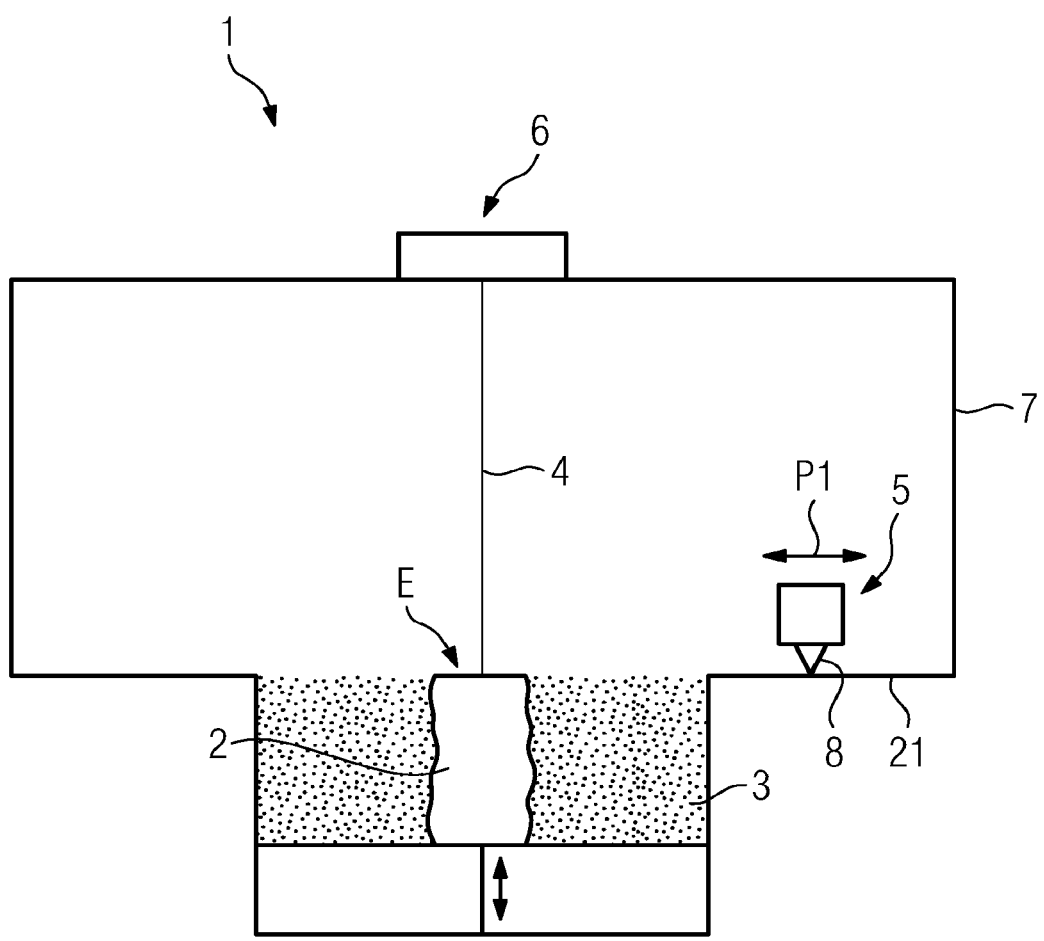

This application claims priority to European Patent Application serial no. 18 161 050.2 filed Mar. 9, 2018, the contents of which is incorporated herein by reference in its entirety.

The invention relates to a build material application device for an apparatus for additively manufacturing at least one three-dimensional object by means of successive layerwise selective irradiation and consolidation of layers of build material which can be consolidated by means of at least one energy beam, the build material application device comprising at least one blade-like build material application member and at least one support unit for supporting the blade-like build material application member.

Build material application devices for respective apparatuses for additively manufacturing three-dimensional objects are generally known from the technological field of additive manufacturing.

Respective build material application devices are configured to apply an amount of build material in a build plane of a respective apparatus for additively manufacturing three-dimensional objects. Respective build material application devices comprise at least one blade-like build material application member and at least one support unit for supporting the blade-like build material application member.

It is known that respective build material application members are subject to wear so that used build material application members have to be replaced by new build material application members from time to time.

Replacement of respective build material application member is oftentimes, a manual procedure which requires cumbersome positional calibration of the new build material application members. Also, operation of the additive manufacturing apparatus has to be interrupted during replacement of a build material application member.

It is thus, the object of the invention to provide a build material application device allowing for a more efficient replacement of respective build material application members.

This object is achieved by a build material application device according to claim 1. The claims depending on claim 1 relate to possible embodiments of the build material application device according to claim 1.

The build material application device described herein is configured to apply an amount, particularly a specific amount, of build material in a build plane of an apparatus for additively manufacturing three-dimensional objects ("apparatus") by means of successive layerwise selective irradiation and resulting consolidation of layers of build material which can be consolidated by means of at least one energy beam. Thus, the build material application device is typically allocated to a respective apparatus. By applying an amount of build material—which can be a powder material, particularly a metal powder—in a build plane of a respective apparatus, a build material layer is formed, which build material layer is to be selectively irradiated and consolidated during operation of the apparatus. Thus, the build material application device is configured to apply an amount of build material in a build plane of an apparatus so as to form a build material layer which is to be selectively irradiated and consolidated during operation of the apparatus. This build material application and build material layer formation, respectively process is repeated several times during operation of the apparatus.

The build material application device comprises at least one build material application member. The build material application member is configured to apply an amount of build material in a build plane of a respective apparatus. The build material application member has the shape of a blade. The build material application member may thus, be built as or comprise a blade. The build material application member may be made of rigid material, e.g. metal, or soft material, e.g. elastomer, for instance. In either case, the build material application member may be made of a material which allows for shaping, e.g. cutting, the material, e.g. with regard to desired dimensions.

The build material application device is typically a re-coating device. Hence, the build material application member is typically a re-coating member, e.g. a re-coating blade.

The build material application device further comprises at least one support unit. The support unit is configured to support the at least one build material application member. As will be apparent from below, the term "support" typically refers to a detachable attachment or connection of a respective build material application member with the support unit.

The support unit is typically moveably supported in at least one motion path relative to the build plane of the apparatus, the build material application device is allocated to, i.e. particularly across the build plane of the apparatus, the build material application device is allocated to. The at least one motion path may be a translatory motion path, for instance. When the support unit is moved in the at least one motion path, the build material application member is typically moved across the build plane of the apparatus. Hence, when moving the support unit in the at least one motion path, the build material application member being supported by the support unit is typically moved across the build plane so that it is possible to apply an amount of build material in the build plane and possible to form a build material layer which is to be selectively irradiated and consolidated on the previously selectively irradiated and consolidated build material layer. The at least one motion path may thus, be deemed or denoted as a build material application path in which (fresh) build material is applied, e.g. on a previously selectively irradiated and consolidated build material layer so as to form a new build material layer which is to be selectively irradiated and consolidated on the previously selectively irradiated and consolidated build material layer. Respective motions of support unit may be guided by a guiding device comprising at least one guiding element, e.g. a guiding rail, co-acting with the support unit. Respective motions of the support unit may be realized by at least one drive unit, e.g. a motor, assignable or assigned to the support unit. Operation of the drive unit and thus, motions of the support unit may be controlled by a hard- and/or software embodied control device.

The support unit comprises at least two support unit members, i.e. at least a first and a second support unit member. Each support unit member may have a, particularly bar- or ridge-like, longitudinal geometric shape. Each support unit member thus, defines a longitudinal axis. As will be apparent from below, the support unit members are typically arranged in a parallel arrangement. The longitudinal axes of the support unit members are thus, typically arranged in parallel. At least one support unit member may be an additively manufactured component.

The first and second support unit member define a, particularly gap-like shaped, receiving section of the support unit for receiving a blade-like build material application member which is to be supported by means of the support unit. In other words, a build material application member which is supported by the support unit is at least partly received in the receiving section. The receiving section unit is typically defined by opposing areas of the first and second support unit members.

The receiving section may comprise at least one inserting region through which a build material application member or an endless build material application member material is insertable in the receiving section. The inserting region may be arranged in such a manner that a build material application member or an endless build material application member material is insertable into the receiving section in an inserting direction parallel to the longitudinal direction of the first and second support unit members. This allows for a horizontal insertion of a build material application member or an endless build material application member material in the receiving section. Alternatively or additionally, the or a receiving section may be arranged in such a manner that a build material application member or an endless build material application member material is insertable into the receiving section in an inserting direction transverse to the longitudinal direction of the first and second support unit members. This allows for a vertical insertion of a build material application member or an endless build material application member material in the receiving section. Other, e.g. angled, inserting directions are conceivable.

At least one of the support unit members is moveably, e.g. slideably, supported relative to another support unit member between a first operating position and a second operating position. As such, the first support unit member may be moveably supported relative to the second support unit member between a first operating position and a second operating position. In the first operating position, which may also be deemed or denoted as holding position, a holding force is exertable or exerted on a blade-like build material application member received in the receiving section. The first operating position thus, results in a stable attachment of a respective build material application member in the receiving section of the support unit which allows for the application of build material in the build plane of the apparatus, the build material application device is allocated to. In the second operating position, which may also be deemed or denoted as non-holding position, no holding force is exertable or exerted on a blade-like build material application member received in the receiving section. The second operating position thus, results in no stable attachment of a respective build material application member in the receiving section of the support unit which allows for a replacement, i.e. particularly a removal of a used (worn) build material application member out of the receiving section of the support unit and insertion of a (new) build material application member in the receiving section of the support unit. It is also possible that two support unit members are moveably supported relative to each other between a respective first operating position and a respective second operating position; the above annotations apply in analogous manner. Respective motions of the first and/or second support unit member may be guided by a guiding device comprising at least one guiding element, e.g. a guiding rail, co-acting with the first and/or second support unit member. In either case, respective motions of the support unit members between the first and second operating position, or vice versa, may be realized by at least one drive unit, e.g. a motor, assignable or assigned to the support unit member(s). Operation of the drive unit and thus, motions of the support unit members may be controlled by the abovementioned or a hard- and/or software embodied control device.

By providing a support unit comprising at least one moveable support unit member, a more efficient, particularly (fully) automatic, replacement of build material application members is possible.

The build material application device may comprise at least one build material application member supply device. The build material application member supply device is configured to supply a build material application member which is to be received in the receiving section. The build material application member supply device, thus serves as a reservoir for (new) build material application member or—as will be apparent from below—endless build material application member material which needs to be shaped so as to form a build material application member of desired dimensions.

The build material application member supply device may be built as or comprise a build material application member storage supply unit and/or an endless build material application member material supply unit. The build material application member storage supply unit is configured to store at least one re-shaped build material application member, typically a plurality of pre-shaped build material application members. Hence, pre-shaped build material application members are storable or stored in a respective build material application member storage supply unit, e.g. in the shape of a magazine for storing pre-shaped build material application members. The term "pre-shaped" refers to the geometric dimensions of the build material application member and typically means that the build material application member already has desired dimensions required for applying a respective amount of build material in the build plane so as to form a build material layer. The endless build material application member material supply unit is configured to store an endless, particularly band-, belt- or strip-like, build material application member material which needs to be shaped, e.g. cut, so as to form a build material application member. Hence, particularly band-, belt- or strip-like, build material application member material is storable or stored in a respective endless build material application member material supply unit, e.g. in the shape of an endless belt.

Hence, the build material application device may further comprise at least one shaping unit. The shaping unit, which is particularly built as or comprises a cutting unit, is configured to shape, particularly cut, an endless, particularly band-, belt- or strip-like, build material application member material in pre-definable or pre-defined dimensions of a build material application member usable or used in the build material application device. Thus, shaping may particularly, comprise shortening, i.e. particularly removing of excess length, of endless build material application member material so as to obtain e.g. a band, belt or strip of desired dimensions for being used as a build material application member. In other words, shaping of endless build material application member material typically comprises shortening its length so that the length of the shaped endless build material application member material portion and the length of the resulting build material application member is adapted to the dimensions of the receiving section.

The shaping unit may be particularly, configured to shape, e.g. cut, the endless build material application member material, when it is inserted in the receiving section of the support unit. The shaping unit may comprise a number of shaping elements, in particular cutting elements, e.g. cutting tools. Respective shaping elements may be provided in the region of the inserting region of the receiving section of the support unit so that excess material can be properly removed. Respective shaping elements, in particular cutting elements, e.g. cutting tools, may also be provided with, e.g. integrally formed with, at least one support unit member. Respective shaping elements may thus, be built as, e.g. protrusion-like, cutting sections extending off respective support unit members, particularly in a direction transverse to the longitudinal direction of the respective support unit member, for instance. A shaping process of endless build material application member material can thus, be realized by a motion of a first support unit member relative to a second support unit member, whereby respective shaping elements perform a shaping process, in particular a cutting process, of the endless build material application member material.

The build material application device may further comprise a handling device. The handling device is configured to handle a build material application member or an endless build material application member material which is to be received in the receiving section, i.e. particularly moved into and/or through the receiving section. The handling device may comprise at least one handling element, e.g. a gripping element, which is configured to handle a build material application member or an endless build material application member material which is to be received in the receiving section of the support unit while being moved into and/or through the receiving section. The handling element may thus, be moveably supported in a handling direction typically defined by the motion required for moving the build material application member or the endless build material application member material which is to be received in the receiving section of the support unit into and/or through the receiving section of the support unit.

As mentioned above, the support unit member may be moveably supported in at least one motion path relative to the build plane of the apparatus, the build material application device is allocated to, i.e. particularly across the build plane of the apparatus, the build material application device is allocated to. As such, the support unit may be moveably supported at least in a receiving position in which receiving a build material application member, particularly from a build material application member supply device, in the receiving section of the support unit is possible. When being moved in the receiving position, the receiving section of the support unit is typically adjacently disposed to a build material application member supply device so that receiving of a new build material application member or endless build material application member material released from the build material application member supply device in the receiving section of the support unit is possible.

The build material application device may further comprise a receiving unit. The receiving unit is configured to receive used or worn build material application members as they are removed from the receiving section. The receiving unit typically comprises a receiving containment defining a receiving volume. Even though it is functionally assigned to the build material application device, the receiving unit may be provided with a wall element, e.g. a bottom wall element, of a process chamber of an additive manufacturing apparatus, the build material application device is allocated to.

As mentioned above, the support unit member may be moveably supported in at least one motion path relative to the build plane of the apparatus, the build material application device is allocated to, i.e. particularly across the build plane of the apparatus, the build material application device is allocated to. As such, the support unit may be moveably supported at least in a removal position in which removing a used or worn build material application member, particularly from the receiving section of the support unit, in the receiving unit is possible. When being moved in the removal position, the receiving section of the support unit is typically adjacently disposed to a respective receiving unit so that receiving of a used or worn build material application member released from the receiving section of the support unit in the receiving unit is possible.

In order to allow for a proper adjustment, particularly a proper positional adjustment, of a build material application member being received in the receiving section of the support unit, i.e. particularly in between respective support unit members of the support unit, the build material application device may comprise an adjusting device. The adjusting device is configured to adjust the position and/or orientation of a build material application member, particularly with regard to a desired position and/or orientation, in the receiving section of the support unit. The adjusting device is thus, configured to change a first position and/or orientation of a build material application member received in the receiving section of the support unit, particularly an initial position and/or orientation of a build material application member right after being received in the receiving section of the support unit, into a second position and/or orientation of the build material application member received in the receiving section of the support unit, particularly in a desired position and/or orientation of the build material application member received in the receiving section of the support unit. Positioning and/or orientating the build material application member is typically performed with regard to a desired position and/or orientation of the build material application member relative to the build plane. The term "position" particularly, refers to positions of the build material application member in a vertical and/or horizontal spatial direction.

The adjusting device may comprise at least one stopper element configured to co-act with a build material application member being received in the receiving section of the support unit so as to adjust the position and/or orientation of the build material application member, particularly with regard to a desired position and/or orientation, in the receiving section. The stopper element may be built as or comprise a geometrical negative of at least a part of the build material application member, i.e. particularly a part of the build material application member which extends out of the receiving section of the support unit towards the build plane in the operational configuration of the build material application device.

A respective stopper element may be moveably supported relative to the support unit between a first operational position, in which it co-acts with a build material application member being received in the receiving section of the support unit so as to adjust the position and/or orientation of the build material application member, particularly with regard to a desired position and/or orientation, in the receiving section, and a second operational position, in which it does not co-act with a build material application member being received in the receiving section of the support unit so as to adjust the position and/or orientation of the build material application member, particularly with regard to a desired position and/or orientation, in the receiving section of the support unit.

The invention further relates to a support unit for a build material application device as described herein. The support unit comprises a first and a second support unit member, the first and second support unit member define a, particularly gap-like shaped, receiving section of the support unit for receiving a blade-like build material application member which is to be supported by means of the support unit. The first support unit member is moveably supported relative to the second support unit member between a first operating position, in which a holding force is exertable or exerted on a blade-like build material application member received in the receiving section, and a second operating position, in which no holding force is exertable or exerted on a blade-like build material application member received in the receiving section. Thus, all annotations concerning the build material application device also apply to the support unit in analogous manner. The support unit may be used inside or outside a machine frame of an additive manufacturing apparatus; when used outside a respective machine frame, the support unit may e.g. be used for preparing, e.g. mounting, a build material application devices.

The invention further relates to an apparatus for additively manufacturing for additively manufacturing at least one three-dimensional object, e.g. a technical component, by means of successive layerwise selective irradiation and consolidation of layers of build material which can be consolidated by means of at least one energy beam. The build material may comprise at least one of a metal powder, a ceramic powder, or a polymer powder, for instance. The energy beam may be an electron beam or a laser beam, for instance. The apparatus can be a selective laser sintering apparatus, a selective laser melting apparatus, or a selective electron beam melting apparatus, for instance. Yet, it is also conceivable that the apparatus is a binder jetting apparatus, particularly a metal binder jetting apparatus, for instance.

The apparatus comprises a number of functional and/or structural devices which are operable or operated during its operation. Each functional and/or structural device may comprise a number of functional and/or structural units. Exemplary functional and/or structural devices are the build material application device which is configured to apply an amount build material which is to be selectively irradiated and consolidated in the build plane of the apparatus and an irradiation device which is configured to selectively irradiate and thereby, consolidate portions of a layer of build material with at least one energy beam. All annotations concerning the build material application device also apply to the apparatus in analogous manner.

The invention also relates to a method for replacing a build material application member supported in a receiving section of a support unit of a build material application device, the method comprises the step of:
  at least moving a first support unit member of the support unit relative to a second support unit member of the support unit from a first operating position, in which a holding force is exertable or exerted on a blade-like build material application member received in the receiving section, in a second operating position, in which no holding force is exertable or exerted on a blade-like build material application member received in the receiving section; and/or
  at least moving a first support unit member of the support unit relative to a second support unit member of the support unit from a second operating position, in which a no holding force is exertable or exerted on a blade-like build material application member received in the receiving section, in a first operating position, in which a holding force is exertable or exerted on a blade-like build material application member received in the receiving section. According to the method, a build material application member is inserted into the receiving section and/or a build material application member is removed from the receiving section when the first support unit member is in the second position. All annotations concerning the build material application device also apply to the method in analogous manner.

Exemplary embodiments of the invention are described with reference to the Fig., whereby:

FIG. 1 shows a principle drawing of an apparatus for additively manufacturing of three-dimensional objects according to an exemplary embodiment; and FIG. 2-7 each show a principle drawing of a build material application device according to an exemplary embodiment.

FIG. 1 shows a principle drawing of an exemplary embodiment of an apparatus 1 for additively manufacturing three-dimensional objects 2, e.g. technical components, by means of successive layerwise selective irradiation and resulting consolidation of layers of a powdered build material 3, e.g. a metal powder, which can be consolidated by means of at least one energy beam 4 according to an exemplary embodiment. The energy beam 4 may be an electron beam or a laser beam, for instance. The apparatus 1 may thus, be a selective electron beam melting apparatus or a selective laser melting apparatus, for instance.

The apparatus 1 comprises a number of functional and/or structural devices which are operable and operated during its operation. Each functional and/or structural device may comprise a number of functional and/or structural units. Operation of the functional and/or structural devices and the apparatus 1, respective is controlled by a (central) control device (not depicted).

Exemplary functional and/or structural devices of the apparatus 1 are an irradiation device 6 and a build material application device 5.

The irradiation device 6 is configured to selectively irradiate and consolidate portions of layers of build material 3 with at least one energy beam 4 during the additive build-up of the object 2. The irradiation device 6 may comprise a beam generating unit (not shown) configured to generate at least one energy beam 4 and a beam deflecting unit (not shown), e.g. a scanning unit, configured to deflect an energy beam 4 to diverse positions within the build plane E of the apparatus 1.

The build material application device 5, which may also be denoted or deemed as a re-coating device, is configured to apply an amount, particularly a specific amount, of build material 3, which may be supplied from a build material supplying device (not shown), such as a dose module, for instance, in the build plane E of the apparatus 1. By applying an amount of build material 3 in the build plane E of the apparatus 1, a build material layer is formed, which build material layer is to be selectively irradiated and consolidated during operation of the apparatus 1. The build material application device 5 is thus, configured to apply an amount of build material 3 in the build plane E of the apparatus 1 so as to form a build material layer which is to be selectively irradiated and consolidated during operation of the apparatus 1. This build material application and build material layer formation process is repeated several times during operation of the apparatus 1.

Figure 2:
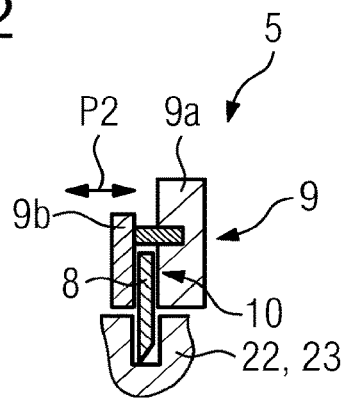
Figure 3:
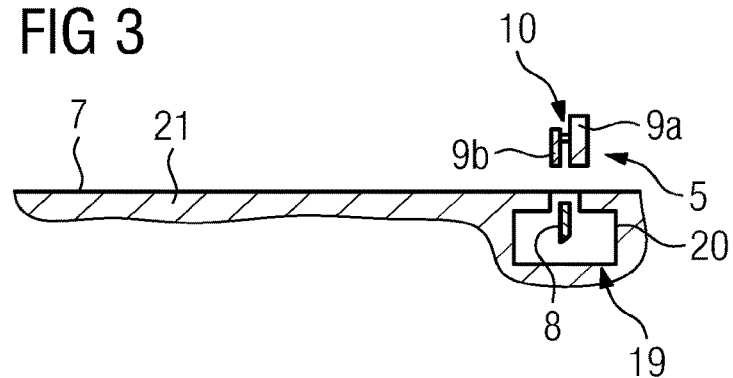
Figure 4:
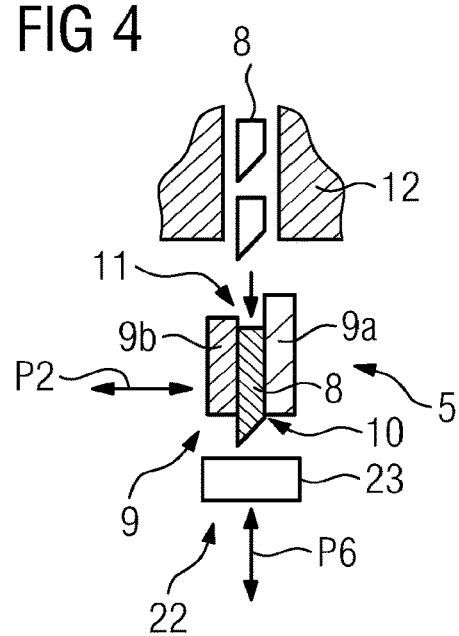
Figure 5:
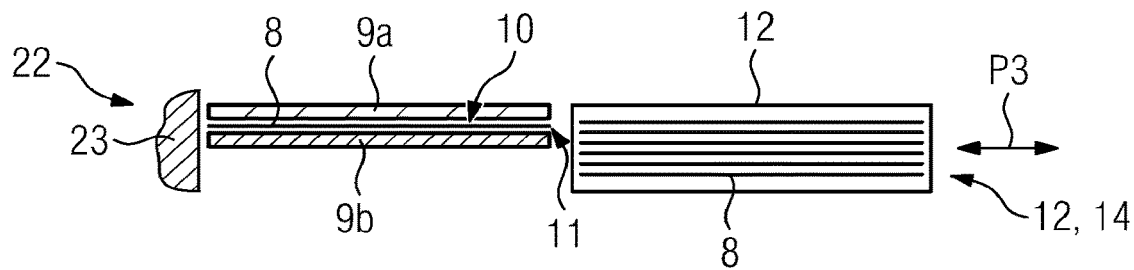
Figure 6:
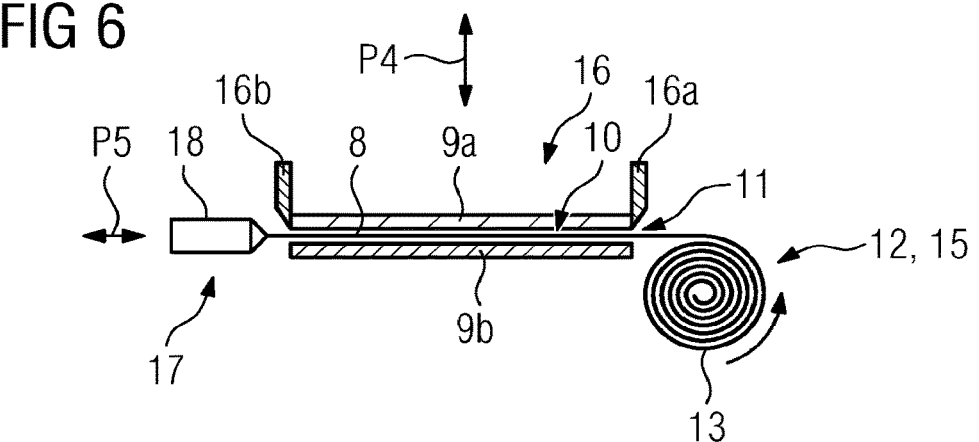
Figure 7:
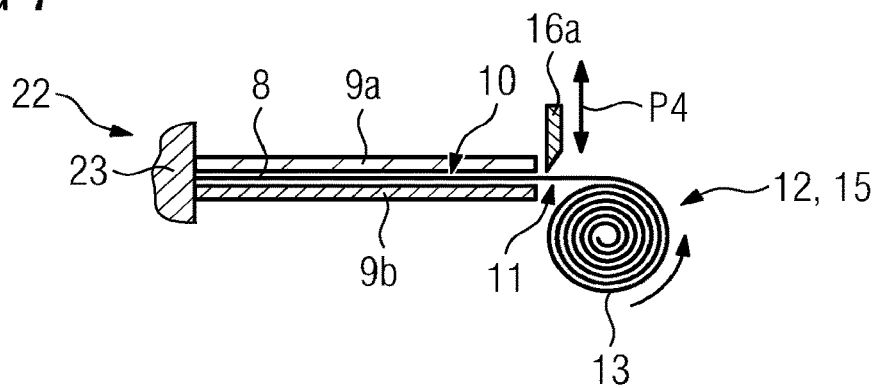

FIG. 2-7 each show exemplary embodiments of the build material application device 5, whereby FIG. 2-4 each show side-views of the build material application device 5 and FIG. 5-7 each show longitudinally cut-views of the build material application device 5. As is apparent from FIG. 2-7, the build material application device 5 comprises the aforementioned blade-like build material application member 8, which may also be denoted or deemed as a re-coating blade.

As is discernible from FIG. 2-7, the build material application member 8 is supported by a support unit 9 of the build material application device 5. The support unit 9 is thus, configured to support the build material application member 8.

The support unit 9 is moveably supported in at least one motion path (indicated by double-arrow P1) relative to the build plane E of the apparatus 1, i.e. particularly across the build plane E of the apparatus 1. When the support unit 9 is moved in the motion path, the build material application member 8 is moved across the build plane E of the apparatus 1. Hence, when moving the support unit 9 in the motion path, the build material application member 8 is moved across the build plane E so that it is possible to apply an amount of build material 3 in the build plane E and possible to form a build material layer which is to be selectively irradiated and consolidated on the previously selectively irradiated and consolidated build material layer. The motion path may thus, be deemed or denoted as a build material application path in which (fresh) build material 3 is applied, e.g. on a previously selectively irradiated and consolidated build material layer so as to form a new build material layer which is to be selectively irradiated and consolidated on the previously selectively irradiated and consolidated build material layer. Respective motions of the support unit 9 may be guided by a guiding device (not depicted) comprising at least one guiding element, e.g. a guiding rail, co-acting with the support unit 9. Respective motions of the support unit 9 may be realized by a drive unit (not depicted), e.g. a motor, assigned to the support unit 9. Operation of the drive unit and thus, motions of the support unit 9 may be controlled by a hard- and/or software embodied control device.

The support unit 9 comprises two support unit members 9a, 9b, i.e. a first support unit member 9a and a second support unit member 9b, in a parallel arrangement. Each support unit member 9a, 9b may have a particularly bar- or ridge-like longitudinal geometric shape. Each support unit member 9a, 9b thus, defines a longitudinal axis.

The support unit members 9a, 9b define a, particularly gap-like shaped, receiving section 10 of the support unit 9 for receiving a build material application member 8 which is to be supported by means of the support unit 9. As is apparent from FIG. 2-7, the receiving section unit 10 is defined by opposing areas of the support unit members 9a, 9b.

The receiving section 10 comprises at least one inserting region 11 through which a build material application member 8 or an endless build material application member material is insertable in the receiving section 10. The inserting region 11 may be arranged in such a manner that a build material application member 8 or a respective endless build material application member material is insertable into the receiving section 10 in an inserting direction parallel to the longitudinal direction of the support unit members 9a, 9b (see particularly, FIG. 2, 5-7). This allows for a horizontal insertion of a build material application member 8 or a respective endless build material application member material in the receiving section 10. Yet, the receiving section 10 may also be arranged in such a manner that a build material application member 8 or an endless build material application member material is insertable into the receiving section 10 in an inserting direction transverse to the longitudinal direction of the support unit members 9a, 9b. This allows for a vertical insertion of a build material application member 8 or an endless build material application member material in the receiving section 10.

As indicated by double-arrow P2, the first support unit members 9a is moveably, in particular slideably, supported relative to the second support unit member 9b between a first operating position (FIG. 2) and a second operating position (FIG. 3). As such, the first support unit member 9a is moveably supported relative to the second support unit member 9b between a first operating position and a second operating position. In the first operating position, which may also be deemed or denoted as holding position, a holding force is exertable or exerted on a blade-like build material application member 8 received in the receiving section 10. The first operating position thus, results in a stable attachment of the build material application member 8 in the receiving section 10 unit which allows for the application of build material in the build plane E of the apparatus 1. In the second operating position, which may also be deemed or denoted as non-holding position, no holding force is exertable or exerted on a blade-like build material application member 8 received in the receiving section 10. The second operating position thus, results in no stable attachment of the build material application member 8 in the receiving section 10 unit which allows for a replacement, i.e. particularly a removal of a used (worn) build material application member 8 out of the receiving section 10 and insertion of a (new) build material application member 8 in the receiving section 10. Respective motions of the first support unit member 9a may be guided by a guiding device (not depicted) comprising at least one guiding element, e.g. a guiding rail, co-acting with the first and/or second support unit member 9a, 9b. Respective motions of the first support unit member 9a between the first and second operating position, or vice versa, may be realized by at least one drive unit (not depicted), e.g. a motor, assigned to the first support unit member 9a. Operation of the drive unit and thus, motions of the first support unit member 9a may be controlled by the abovementioned or a hard- and/or software embodied control device.

Even if not depicted in the Fig., it is also possible that the second support unit member 9b is moveably supported relative to the first support unit member 9a. Likewise, both support unit members 9a, 9b could be moveably supported.

As is apparent form the embodiments of FIG. 5-7, the build material application device 5 may comprise at least one build material application member supply device 12. The build material application member supply device 12 is configured to supply a build material application member 8 or an endless build material application member material 13 which is to be received in the receiving section 10. The build material application member supply device 12, thus serves as a reservoir for (new) build material application member 8 or an endless build material application member material 13 which needs to be shaped so as to form a build material application member 8 of desired dimensions.

According to the exemplary embodiment of FIG. 5, the build material application member supply device 12 is built as a build material application member storage supply unit 14. The build material application member storage supply unit 14 is configured to store a plurality of pre-shaped build material application members 8. Hence, pre-shaped build material application members 8 are storable or stored in a respective build material application member storage supply unit 14, e.g. in the shape of a magazine for storing pre-shaped build material application members 8.

According to the exemplary embodiments of FIG. 6, 7, the build material application member supply device 12 is built as an endless build material application member material supply unit 15. The endless build material application member material supply unit 15 is configured to store an endless, particularly band-, belt- or strip-like, build material application member material 13 which needs to be shaped so as to form a build material application member 8. Hence, particularly band-, belt- or strip-like, build material application member material 13 is storable or stored in a respective endless build material application member material supply unit 15, e.g. in the shape of an endless belt.

As is apparent from FIG. 6, 7 the build material application device 5 may further comprise a shaping unit 16. The shaping unit 16, which is particularly built as or comprises a cutting unit, is configured to shape, particularly cut, an endless build material application member material 13 in pre-definable or pre-defined dimensions of a build material application member 8 usable or used in the build material application device 5. Thus, shaping may particularly, comprise shortening, i.e. particularly removing of excess length, of endless build material application member material 13 so as to obtain e.g. a band, belt or strip of desired dimensions for being used as a build material application member 8. The shaping unit 16 may be configured to shape, e.g. cut, the endless build material application member material 13, when it is inserted in the receiving section 10 of the support unit 9.

The shaping unit 16 may comprise a number of shaping elements 16a, 16b, in particular cutting elements, e.g. cutting tools. As is apparent from FIG. 6, 7, respective shaping elements 16a, 16b may be provided in the region of the inserting region 11 of the receiving section 10 so that excess material can be properly removed. Respective shaping elements 16a, 16b, in particular cutting elements, e.g. cutting tools, may be moveably supported in a cutting direction (indicated by arrow P4 in FIG. 6, 7) relative to the endless build material application member material 13 which is to be shaped so as to perform a shaping process.

Respective shaping elements 16a, 16b, in particular cutting elements, e.g. cutting tools, may also be provided with, e.g. integrally formed with, at least one support unit member 9a, 9b. Respective shaping elements may thus, be built as, e.g. protrusion-like, cutting sections extending off respective support unit members 9a, 9b, particularly in a direction transverse to the longitudinal direction of the respective support unit member 9a, 9b. A shaping process of endless build material application member material 13 can thus, be realized by a motion of a first support unit member 9a relative to a second support unit member 9b, whereby respective shaping elements 16a, 16b perform a shaping process, in particular a cutting process, of the endless build material application member material 13.

The support unit 9 may be moveably supported at least in a receiving position in which receiving a build material application member 8 from the build material application member supply device 12, e.g. the build material application member storage supply unit 14 or the endless build material application member material supply unit 15, in the receiving section 10 of the support unit 9 is possible. When being moved in the receiving position, the receiving section 10 of the support unit 9 is adjacently disposed to the build material application member supply device 12 so that receiving of a new build material application member or endless build material application member material released from the build material application member supply device in the receiving section of the support unit is possible. The same applies to the optional embodiment that the build material application member supply device 12 is moveably supported in a receiving position relative to the support unit 9 in which receiving a build material application member 8 from the build material application member supply device 12, e.g. the build material application member storage supply unit 14 or the endless build material application member material supply unit 15, in the receiving section 10 of the support unit 9 is possible (as indicated by double-arrow P3 in FIG. 5).

As is apparent from FIG. 6, the build material application device 5 may further comprise a handling device 17. The handling device 17 is configured to handle a build material application member 8 or an endless build material application member material 13 which is to be received in the receiving section 10, i.e. particularly moved into and/or through the receiving section 10. The handling device 17 may comprise at least one handling element 18, e.g. a gripping element, which is configured to handle a build material application member 8 or an endless build material application member material 13 which is to be received in the receiving section 10 while being moved into and/or through the receiving section 10. The handling element 18 may be moveably supported in a handling direction (as indicated by double-arrow P5 in FIG. 6) defined by the motion required for moving the build material application member 8 or the endless build material application member material 13 which is to be received in the receiving section 10 into and/or through the receiving section 10.

Returning to the exemplary embodiment of FIG. 3, the build material application device 5 may further comprise a receiving unit 19. The receiving unit 19 is configured to receive used or worn build material application members 8 as they are removed from the receiving section 10. The receiving unit 19 comprises a receiving containment 20 defining a receiving volume. Even though it is functionally assigned to the build material application device 5, the receiving unit 19 may be provided with a wall element 21, e.g. a bottom wall element, of the process chamber 7 of the apparatus 1.

The support unit 9 may be moveably supported at least in a removal position (see FIG. 3) in which removing a used or worn build material application member 8, particularly from the receiving section 10, in the receiving unit 19 is possible. When being moved in the removal position, the receiving section 10 of the support unit 9 is adjacently disposed to the receiving unit 19 so that receiving of a used or worn build material application member 8 released from the receiving section 10 of the support unit 9 in the receiving unit 19 is possible.

As is apparent from the exemplary embodiments of FIG. 2, 4, 5, 7, the build material application device 5 may further comprise an adjusting device 22. The adjusting device 22 is configured to adjust the position and/or orientation of a build material application member 8, particularly with regard to a desired position and/or orientation, in the receiving section 10 of the support unit 9. The adjusting device 22 is thus, configured to change a first position and/or orientation of a build material application member 8 received in the receiving section 10, particularly an initial position and/or orientation of a build material application member 8 right after being received in the receiving section 10, into a second position and/or orientation of the build material application member 8 received in the receiving section 10, particularly in a desired position and/or orientation of the build material application member 8 received in the receiving section 10. Positioning and/or orientating the build material application member 8 is typically performed with regard to a desired position and/or orientation of the build material application member 8 relative to the build plane E. The term "position"

particularly, refers to positions of the build material application member 8 in a vertical and/or horizontal spatial direction.

As is apparent from FIG. 2, 4, 5, 7, the adjusting device 22 may comprise stopper elements 23 configured to co-act with a build material application member 8 being received in the receiving section 10 of the support unit 9 so as to adjust the position and/or orientation of the build material application member 8, particularly with regard to a desired position and/or orientation, in the receiving section 10. As is apparent from the exemplary embodiment of FIG. 2, a respective stopper element 23 may be built as or comprise a geometrical negative of at least a part of the build material application member 8, i.e. particularly a part of the build material application member 8 which extends out of the receiving section 10 of the support unit 9 towards the build plane E in the operational configuration of the build material application device 5.

As indicated by double-arrow P6 in FIG. 4, a respective stopper element 23 may be moveably supported relative to the support unit 9 between a first operational position (see FIG. 4), in which it co-acts with a build material application member 8 being received in the receiving section 10 of the support unit 9 so as to adjust the position and/or orientation of the build material application member 8, particularly with regard to a desired position and/or orientation, in the receiving section 10, and a second operational position (not depicted in the Fig.), in which it does not co-act with a build material application member 8 being received in the receiving section 10 of the support unit 9 so as to adjust the position and/or orientation of the build material application member 8, particularly with regard to a desired position and/or orientation, in the receiving section 10.

The apparatus 1 and the build material application device 5 allows for implementing a method for replacing a build material application member 8 supported in a receiving section 10 of a support unit 9 of a build material application device 5, the method comprises the step of:
- at least moving a first support unit member 9a of the support unit 9 relative to a second support unit member 9b of the support unit 9 from a first operating position, in which a holding force is exertable or exerted on a build material application member 8 received in the receiving section 10, in a second operating position, in which no holding force is exertable or exerted on a build material application member 8 received in the receiving section 10; and/or
- at least moving a first support unit member 9a of the support unit 9 relative to a second support unit member 9b of the support unit 9 from a second operating position, in which no holding force is exertable or exerted on a build material application member 8 received in the receiving section 10, in a first operating position, in which a holding force is exertable or exerted on a build material application member 8 received in the receiving section 10. According to the method, a build material application member 8 is inserted into the receiving section 10 and/or a build material application member 8 is removed from the receiving section when the first support unit member 9a is in the second position.

The features of the exemplary embodiments of the Fig. may be arbitrarily combined with each other.

The invention claimed is:

1. A build material application device for additively manufacturing at least one three-dimensional object by successive layerwise selective irradiation and consolidation of layers of build material with at least one energy beam, the build material application device comprising:
   at least one build material application member; and
   at least one support unit for supporting the build material application member, wherein:
      the support unit comprises a first support unit member and a second support unit member, the first and second support unit members defining a receiving section therebetween configured for receiving the at least one build material application member which is to be supported with the support unit, wherein the first support unit member is moveably supported relative to the second support unit member between a first operating position, in which a holding force is exerted on the at least one build material application member within the receiving section, and a second operating position, in which no holding force is exerted on the at least one build material application member within the receiving section.

2. The build material application device according to claim 1, wherein the receiving section has a gap shaped configuration.

3. The build material application device according to claim 1, wherein the receiving section comprises at least one inserting region through which the at least one build material application member is insertable in the receiving section, wherein the inserting region is arranged in such a manner that the at least one build material application member is insertable into the receiving section in an inserting direction parallel to a longitudinal direction of the support unit members.

4. The build material application device according to claim 1, wherein the receiving section comprises at least one inserting region through which the at least one build material application member is insertable in the receiving section, wherein the receiving section is arranged in such a manner that the at least one build material application member is insertable into the receiving section in an inserting direction transverse to the longitudinal direction of the support unit members.

5. The build material application device according to claim 1, further comprising a build material application member supply device configured to supply the at least one build material application member or an endless build material application member material configured to be received in the receiving section.

6. The build material application device according to claim 5, wherein the build material application member supply device comprises a build material application member storage supply unit configured to store the at least one build material application member.

7. The build material application device according to claim 5, wherein the build material application member supply device comprises an endless build material application member material supply unit configured to store an endless build material application member material which needs to be shaped so as to form the at least one build material application member.

8. The build material application device according to claim 7, further comprising a shaping unit which is configured to cut a strip of build material application member material in pre-definable or pre-defined dimensions of the at least one build material application member usable or used in the build material application device when the strip of build material application member material is inserted in the receiving section.

9. The build material application device according to claim 1, further comprising a receiving unit for receiving used build material application members as they are removed from the receiving section.

10. The build material application device according to claim 1, wherein the support unit is moveably supported at least in a receiving position in which receiving the at least one build material application member from a build material application member supply device in the receiving section is possible.

11. The build material application device according to claim 1, wherein the support unit is moveably supported at least in a receiving position in which at least in a removal position in which removing the at least one build material application member from the receiving section in a receiving unit is possible.

12. The build material application device according to claim 1, further comprising a handling device configured to handle the at least one build material application member or an endless build material application member material which is to be received in the receiving section.

13. The build material application device according to claim 1, further comprising an adjusting device configured to adjust the position and/or orientation of the at least one build material application member with regard to a desired position and/or orientation in the receiving section.

14. The build material application device according to claim 13, wherein the adjusting device comprises at least one stopper element configured to co-act with the at least one build material application member being received in the receiving section so as to adjust the position and/or orientation of the at least one build material application member with regard to the desired position and/or orientation in the receiving section.

15. The build material application device according to claim 14, wherein the at least one stopper element is moveably supported relative to the support unit between a first operational position, in which it co-acts with the at least one build material application member being received in the receiving section so as to adjust the position and/or orientation of the at least one build material application member with regard to a desired position and/or orientation in the receiving section, and a second operational position, in which it does not co-act with the at least one build material application member being received in the receiving section so as to adjust the position and/or orientation of the at least one build material application member with regard to the desired position and/or orientation in the receiving section.

16. A method for replacing a build material application member supported in a receiving section of a support unit of a build material application device, the method comprising:
 moving a first support unit member of the support unit relative to a second support unit member of the support unit from a first operating position, in which a holding force is exerted on at least one build material application member within the receiving section, to a second operating position, in which no holding force is exerted on the at least one build material application member within the receiving section; or
 moving a first support unit member of the support unit relative to a second support unit member of the support unit from a second operating position, in which a no holding force is exerted on the at least one build material application member within the receiving section, to a first operating position, in which a holding force is exerted on the at least one build material application member within the receiving section; whereby
 the at least one build material application member is inserted into the receiving section or the build material application member is removed from the receiving section when the first support unit member is in the second position.

* * * * *